US008818556B2

(12) United States Patent
Sanchez et al.

(10) Patent No.: US 8,818,556 B2
(45) Date of Patent: Aug. 26, 2014

(54) MULTI-STATE MODEL FOR ROBOT AND USER INTERACTION

(75) Inventors: Russell Irvin Sanchez, Seattle, WA (US); Malek M. Chalabi, Seattle, WA (US); Kordell B. Krauskopf, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 445 days.

(21) Appl. No.: 13/005,839

(22) Filed: Jan. 13, 2011

(65) Prior Publication Data

US 2012/0185090 A1     Jul. 19, 2012

(51) Int. Cl.
*G09G 5/00*      (2006.01)

(52) U.S. Cl.
USPC .......................................... 700/253; 382/155

(58) Field of Classification Search
USPC .............. 700/253, 257, 245, 247; 706/14, 45; 382/155; 318/567, 568.12, 568.15, 318/568.16
See application file for complete search history.

(56) References Cited

U.S. PATENT DOCUMENTS

| | | | |
|---|---|---|---|
| 6,453,213 B1 | 9/2002 | Hong | |
| 6,556,892 B2 * | 4/2003 | Kuroki et al. | 700/245 |
| 6,819,978 B2 * | 11/2004 | Funada | 700/245 |
| 7,139,642 B2 * | 11/2006 | Kamoto et al. | 700/248 |
| 7,415,321 B2 | 8/2008 | Okazaki | |
| 8,292,433 B2 | 10/2012 | Vertegaal | |
| 8,392,341 B2 | 3/2013 | Lee | |
| 2004/0095389 A1 * | 5/2004 | Sidner et al. | 345/764 |

OTHER PUBLICATIONS

Sidner, Ace L., et al., "Engagement Rules for Human-Robot Collaborative Interaction", May 2003, http://citeseerx.ist.psu.edu/viewdoc/download?doi=10.1.1.72.1108&rep=rep1&type=pdf.
Michalowski, M.P., et al., "A Spatial Model of Engagement for a Social Robot", 2006, http://ieeexplore.ieee.org/stamp/stamp.jsp?tp=&arnumber=1631755&isnumber=34213.
Sidner, Ace L., et al., "An Architecture for Engagement in Collaborative Conversations between a Robot and Humans", Dec. 2003, http://citeseerx.ist.psu.edu/viewdoc/download?doi=10.1.1.152.8344&rep=rep1&type=pdf.
Sabanovic, Selma, et al., "Robots in the Wild: Observing Human-Robot Social Interaction Outside the Lab", 2006, http://marek.michalowski.me/publications/AMC06SabanovicEtal.pdf.
Francois, Dorothee, et al., "Using Real-Time Recognition of Human-Robot Interaction Styles for Creating Adaptive Robot Behaviour in Robot-Assisted Play", 2009, http://www.robotcub.org/misc/papers/09_Francois_Dautenhahn_Polani.pdf.
Fong, Terrence, "Peer-to-Peer Human-Robot Interaction for Space Exploration", 2004, http://citeseerx.ist.psu.edu/viewdoc/download?doi=10.1.1.1.1518&rep=rep1&type=pdf.
Sidner, C.L., et al., "Human—Robot Interaction: Engagement between Humans and Robots for Hosting Activities", 2004, http://ieeexplore.ieee.org/stamp/stamp.jsp?tp=&arnumber=1166980.
"International Search Report", Mailed Aug. 30, 2012, Application No. PCT/US2012/021001, Filed Date Jan. 12, 2012, pp. 1-10.

* cited by examiner

*Primary Examiner* — Dalena Tran
(74) *Attorney, Agent, or Firm* — Steve Wight; Brian Haslam; Micky Minhas

(57) ABSTRACT

The subject disclosure is directed towards a robot device including a model that controls a robot's task-related operations to perform tasks and user-engagement operations to interact with the robot. The model controls the operating states, including transitioning from an autonomous task state to an engaged state based on current context determined from various stimuli, e.g., information received via sensors of the robot and/or learned data. The robot may seek to engage the user, the user may seek to engage the robot, or the user and robot may meet by chance in which either may attempt to initiate the engagement.

20 Claims, 4 Drawing Sheets

MULTI-STATE MODEL FOR ROBOT AND USER INTERACTION

BACKGROUND

Devices designed for human use such as appliances, vehicles, computers, phones, handheld devices and the like rely on one or more explicit physical actions of the user to initiate interaction, primarily touch or other hand-based contact. For example, a microwave oven waits for someone to press its keypad, a computer waits for someone to move the mouse or press a key, a mobile phone waits for someone to touch its screen or buttons, and so on. Such devices are engaged with a user when explicitly physically acted upon (directly or indirectly through a remote controller), and the physical actions of the user govern interaction.

In contrast, a consumer robot (comprising an assembly of sensory awareness, computational intelligence, and mobility) exposes an entirely different scope of interaction with humans. For one, explicit physical contact is generally not the best way to initiate engagement with a robot. Instead, for example, either party (human or robot) may initiate engagement or disengagement with the other, including via verbal or gestural communication. For example, a robot can search for, recognize, physically approach and engage a specific person to deliver a message, ask a question or offer information. Note that direct interaction to engage is not necessary; for example, a user may need assistance from a robot and summon it from another room.

Another significant difference from conventional electronic devices is that a robot often does not wait in a fixed position, but rather maneuvers around a space (e.g., a house) performing tasks on behalf of users, owners, household members, visitors or guests or autonomously exploring the space, recording and reporting unusual occurrences, or even "entertaining" itself. The mere proximity between a robot and a human does not necessarily correspond to engagement, as both parties (robot and human) may be occupied with independent tasks at any time. For example the two may be passing each other in a hallway, each focused on separate unrelated tasks. Even though both parties are available for engagement, engagement is not needed. However, while passing (e.g., in a hallway) by chance, one party might wish to make a request of the other.

Further, when a human and robot are engaged, either party can disengage for a variety of reasons based on situational context. For example the robot may ask for permission to embark on a previously scheduled task, or the human may be interrupted by a separate conversation.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a robot device includes an interaction model comprising multiple states (e.g., engaged, user-directed, self-directed, rest) that controls a robot's task-related operations and user-engagement operations to interact with the robot. The model controls the operation of the robotic device with respect to operating states, including transitioning from an autonomous task state in which the robot performs a task, to an engaged state in which the robot interacts with the user, and vice-versa. The model determines when to transition based on a current context, including information received via sensors of the robot. The robot may seek to engage the user, the user may seek to engage the robot, or the user and robot may meet by chance in which either may attempt to initiate the engagement.

In one aspect, via the model the robot operates in an autonomous task state, which includes a user-directed mode in which the robot performs a user task based upon user input, and a self-directed mode in which the robot performs tasks that are not based upon user input. The robot may also be in a rest state, which it may exit upon a task-related triggering event or upon detecting a need for engagement with a user. A priority level ordering places the robot in the engagement state above the autonomous state (user-directed mode), which in turn is above the autonomous state (self-directed mode), which in turn are above the rest state.

In another aspect, the robot enters into the engagement state and operates differently therein based upon which stimulus of a plurality of stimuli caused the transition to the engagement state. Example stimuli include a remote proxy communication, audio data (e.g., speech corresponding to the robot's name), or detecting motion that corresponds to a user.

The robot may initiate engagement by moving towards the user, or outputting audible and/or visible communication data directed towards the user. The attempt to engage with the user may be adapted based on previous engagement history with the user, e.g., not attempting to engage too frequently by waiting until a frequency-determined time for the engagement attempt is reached.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a robot device that includes a human (or "user") and robot interaction model comprising multiple states (e.g., engaged, user-directed, self-directed, rest) that controls a robot's interaction behavior in a way that facilitates natural, appropriate, useful and enjoyable interaction. In one aspect, the model governs transitions between non-engaged and engaged states, methods of initiation by robot or human, and the use of context awareness and sensory capability to manage these transitions. The model may define other robot behaviors, such as how a robot uses sensory awareness to mediate its engagement availability.

It should be understood that any of the examples herein are non-limiting. For example, various models and the like are used as examples herein, however other models than those exemplified may be used. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in robotic technology in general.

Figure 1:
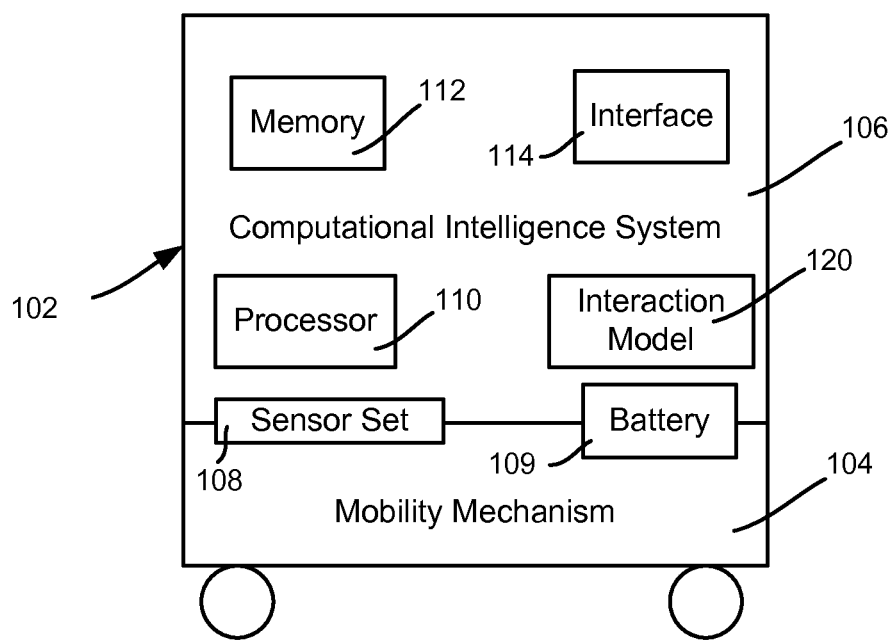
FIG. 1 is a block diagram representing an example embodiment of a robotic device in which a computational intelligence system of the robotic device includes a model that determines states of operation of the robotic device.

FIG. 1 is a block diagram representing an example implementation of a robot device 102 configured for mobility via a mobility (drive) mechanism 104. A computational intelligence system 106 drives the mobility mechanism 104 via appropriate instructions. This provides mobility to the robot device 102 so that the computational intelligence system 106 is able to be transported based upon instructions from the computational intelligence system 106.

In general, the robot 102 includes a sensor set 108 comprising one or more sensors that provide the computational intelligence system 106 with one or more signals to indicate current state data and the like, such as environmental data, time of day, day of week, current location, battery charge remaining, nearby people recognized, and so forth. This state data, along with other maintained data, such as the robot's schedule, history data (e.g., adapted and learned knowledge) and so forth comprise a current context.

The sensor set 108 may include any mechanical, electrical, optical and/or magnetic sensor or sensors, and each may be positioned at appropriate locations on the robot 102 for sensing, e.g., mounted high to obtain a particular viewing angle. The sensor set 108 may include one or more cameras by which the computational intelligence system 106 is able to detect the physical presence gaze direction, hand gestures, and so forth of a particular person. The robot 102 also includes a device battery 109 (or other suitable portable power source).

The computational intelligence system 106 includes a processor 110, memory 112 and interface 114. As described below, the interface 114 may be configured for the robot 102 to communicate via various types of input and output. As also described below, the computational intelligence system 106 includes a user (human) interaction model 120.

Figure 2:
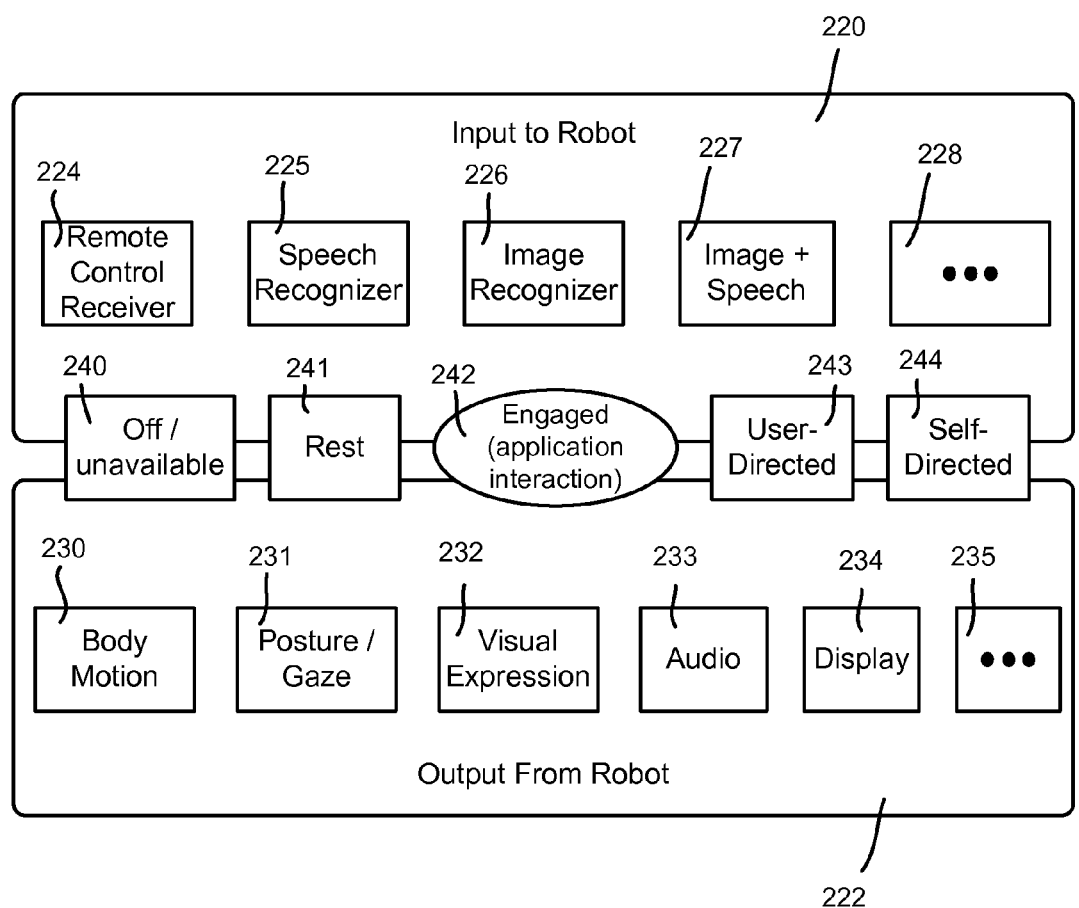
FIG. 2 is a representation of an example robot device's input modalities, output modalities and states of operation.

FIG. 2 shows some example mechanisms for communication with a robot, including one or more robot input mechanisms 220 and robot output mechanisms 222. As represented in FIG. 2, a robot may include a remote control receiver 224, such as for receiving remote control proxy user commands, particular from a remote location such as another room. Note that one type of remote control input is referred to as "pendant" input, because the user may wear the remote control in one embodiment of a remote control. A robot may also receive remote control commands from any wired (if physically coupled) or wireless source, e.g., a user may communicate with a robot over an internet connection, via a personal computer, and so forth.

Another type of input is speech, which the robot processes by a speech recognizer 225. Image input, such as captured by a video camera or depth sensor are other types of input, and may be processed with face recognition technology, position detection, gaze detection, eye tracking, gesture detection/ recognition technology, skeletal tracking, and so forth, as represented in FIG. 2 by an image recognizer (block 226). Note that an image/sequence of captured images are only examples, and need not be conventional images or video, e.g., infrared, motion, depth sensor and the like are all able to be captured and detected by a suitable camera or similar sensor.

Also represented in FIG. 2 is image and speech input, detected via block 227. This refers to speech in combination with gesture, which may be combined into different meanings; (e.g., the spoken word "move" accompanied by an appropriate hand gesture may be used to instruct the robot to move as well as which direction to move, such as left or right). Other types of input may be combined, e.g., a user looking at the robot when talking to it may be interpreted differently than if the user is looking away from the robot (e.g., the user may not even be talking to the robot at all).

Other types of input may be received as sensed by appropriate sensors, e.g., touch, smell, temperature, humidity, user biometric data, and so forth. Block 228 represents any such other input mechanisms and/or sensors.

The robot is able to output information via one or more of the various output mechanisms 222 including some or all of those depicted in FIG. 2, including via body motion, posture/ gaze 231, visual expression 232 (e.g., animated motion like "eye" blinking), audio 233 and display 234 (such as graphical user interface, images, and the like which can be rendered via a display device such as a screen or projector). Other output such as vibration or scent is represented via block 235. The robot may use its one or more of its output mechanisms 222 while in any state to indicate its mood, general status, task status, and so forth.

Note that the depicted output mechanisms 222 are generally directed towards communicating with a human user. However, other types of output may be directed towards electronic devices, such as another robot, a computer, a telephone, an appliance, and so forth. These devices may be communicated with via wired or wireless radio signals, or audio samples, for example. Further, the robot may interact with other robots, as well as other entities such as pets, inanimate objects (e.g., a game console) and so on. Thus, humans, as well as such other entities are referred to herein as "users" (although "human" is used interchangeably with "user" herein since a human is the most typical user).

FIG. 2 also shows some example operating states 240-244 that the robot may be in at any time, including an engaged state 242 in which the input and output mechanisms 220 and 222 are being used for robot-user interaction. While the represented states 240-244 are described below, it should be understood that one or more other states are feasible, and that states may be combined (e.g., in another implementation, the robot may be running some part of a user-directed task while otherwise in a resting state). The following table summarizes the example states:

| State | Description | Priority |
| --- | --- | --- |
| Engaged | User is actively interacting with robot | 1 |
| User-Directed | Actively working to accomplish a task assigned by a user | 2 |
| Self-Directed | Autonomous activity, exploring, running self-selected tasks | 3 |
| Rest | Reduced or no activity | 4 |

As described below, the robot has a clear priority order of states as shown in the above table. A higher priority state can interrupt a lower priority state, and engagement (transitioning to the engaged state) can interrupt any self-directed or user-directed task.

Figure 3:
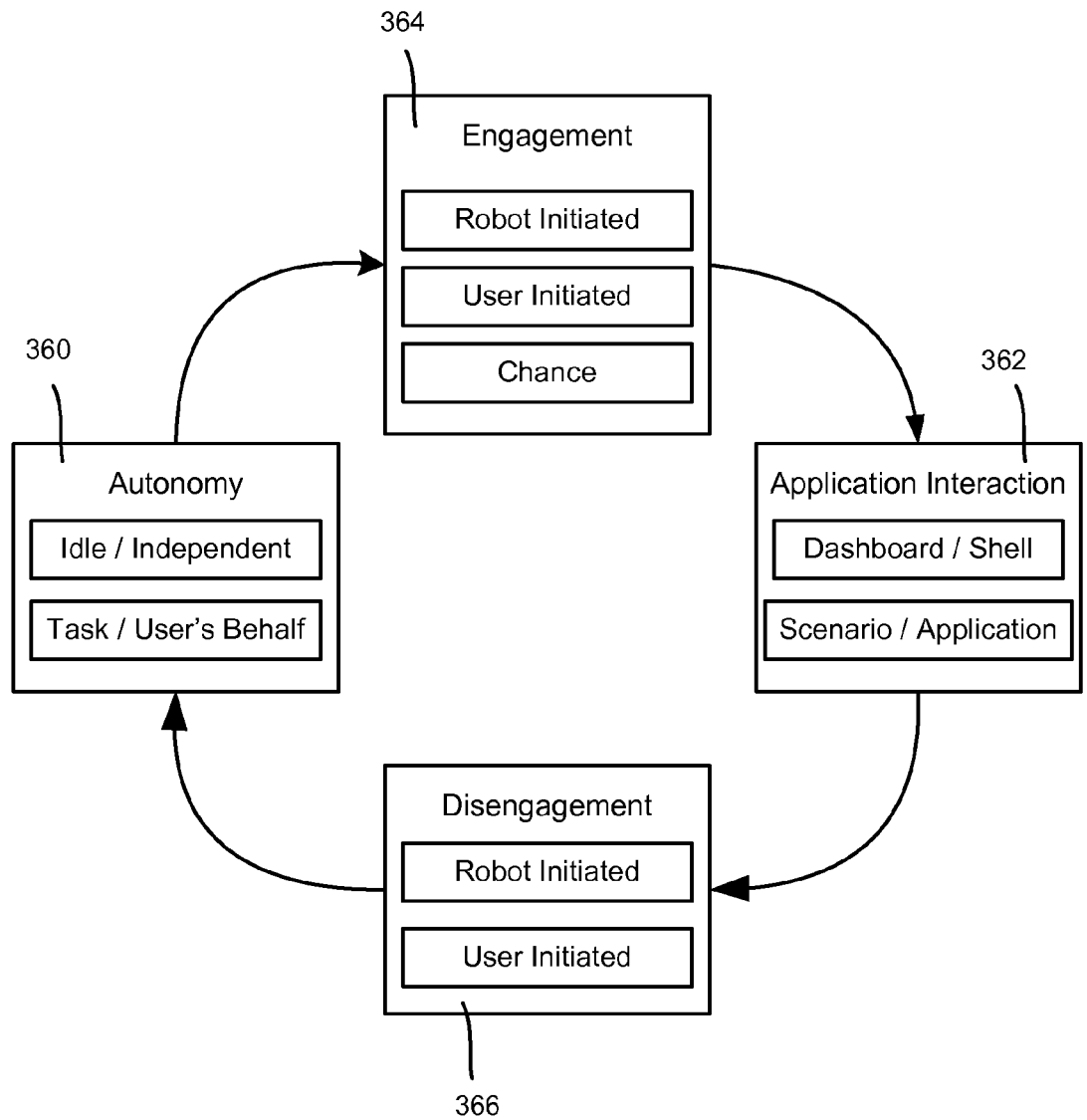
FIG. 3 is a state diagram representing states of a robot device and transitions between those states.

FIG. 3 is a representation of the transitions between the robot's autonomous operating mode 360 (corresponding to the user-directed or self-directed states 243 and 244 of FIG. 2)

to the application interaction mode 362 (corresponding to the engaged state 242 of FIG. 2). In general and as represented in FIG. 3, the robot transitions from the autonomous mode 360 to the application interaction mode 362 (the engaged state) upon detected engagement (block 364) with the user, and from the application interaction mode 362 back to the autonomous mode 360 upon detected disengagement (block 366). Note that other states in FIG. 2 such as off/unavailable state 240 and resting state 241 are described below with respect to these other states, e.g., a robot can go from the resting state 241 to the autonomy mode 360 without engaging with a human, such as based on time of day or other triggering event.

As can be seen from these transitions, there is a need to distinguish a user's engaged and disengaged states with respect to a robot. As will be understood, situational context is generally relevant in making the distinction.

To this end, the dynamic, multi-state user-robot interaction model 120 (FIG. 1) is described herein that includes an engagement/disengagement model within an unstructured environment based on contextual factors such as user preferences, state data, location, etiquette, social norms and so forth. The model governs transitions between engaged and non-engaged states, the initiation of engagement and disengagement either by robot or user, and the use of context awareness and sensory capability to manage these transitions. The model defines how the robot uses sensory awareness to mediate its engagement availability More particularly, either party (user or robot) needs to be able to appropriately initiate engagement or disengagement with the other in a variety of ways (typically non-contact methods) depending on situational context. This may include factors such as time of day, location, identity of the user, and anticipated needs of each party at the time. The robot may optimize its availability based on observed/learned household patterns like typical gathering times and places.

As described above with reference to FIG. 2, to facilitate engagement, the robot has multiple states (e.g., engaged, user-directed, self-directed, rest) that define the scope of interactions in each state and transitions between states. When the robot is engaged with a user, the user is waiting for, receiving or responding to input. Engagement may be sustained based on contextual cues. For example, proximity of the user and robot, gaze/eye contact between the user and the robot, localization of speech, and/or continued interaction may control engagement versus disengagement. Note that if the user is engaged with the robot using speech, motion, or face detection, then the user and robot are positioned within interaction range of each other (which is generally a greater range for audio than for motion/face detection). If the user is engaged with the robot using a remote control (proxy) device, the user and robot can be positioned anywhere within the transmission/receiving range of one another.

It should be noted that the following examples are directed to a scenario in which a user is in charge of the robot whenever there is a decision point reached that involves a user, e.g., overriding a scheduled task. Note that in some scenarios, different users may interact with and direct (command) the robot. These may be peer users such that any conflict is resolved by the model 120, e.g., the last command wins, or there may be a hierarchy of users, e.g., user B cannot override user A's task set, although user B can briefly engage with the robot to schedule a task or find out status information, for example, such as when the robot will be available for user B's task set. Another type of user may be a non-authorized/non-authenticated user from whom the robot will not accept commands, such as a non-recognized person (until an authorized user tells the robot otherwise, for example). This may be dependent on the application, e.g., while in a patrolling task, the robot may only be allowed to communicate with the highest-level user or users. Further, the examples correspond to one implementation of the model; alternative implementations of the model may have other rules and the like that govern robot behavior, and some aspects of the exemplified model may be user configurable (e.g., to override a rule) according to user preferences.

As one example rule, the model 120 specifies that while engaged, the robot cannot enter the self-directed sate 244 without the user agreeing to let the robot do so, and can only go to the rest state 241 by explicit command from the user. Even in extreme cases, such as a low battery situation, during engagement the robot asks (or otherwise signals) for a user to let it go recharge.

In the user-directed state 234, the robot has disengaged (block 366) and entered the autonomous mode of operation to perform a task on behalf of a user, as represented in FIG. 3. This state is entered in response to an explicit command from the user, via the engaged state or by an explicit task set up to occur at a specific time. Other tasks the robot may undertake that are not explicitly obtained while in the engaged state (whether directly or via a user-specified schedule or other criteria) are considered as being run in the self-directed state 244.

While in the user-directed state 243, the robot may engage with the user if requested, but will not enter into any self-directed tasks until the user-directed task set has finished. As a result, self-directed tasks that normally happen at a given time, such as exploring to improve the robot's metric map, wait until the user-directed task (or task set) is complete.

Once the user-directed task set is complete, the robot transitions to its self-directed state 244. Note that tasks scheduled to run by users, such as patrolling, are run as user-directed tasks. An immediate user-directed task takes precedence over a scheduled task.

If the robot is engaged by a user when in the user-directed state 243, the robot outputs information (e.g., a dialog) indicating that it is busy on a task. The dialog forces the user to either dismiss the dialog (thus canceling the engagement request) and allow the robot to proceed with its task, or cancel (or pause) the current user-directed task or application so the user can continue engagement.

In the self-directed state, the robot is acting fully autonomously. In this state, the robot performs tasks that the robot decides to do, e.g., improve/update its internal map of the house, charge its battery in anticipation of the user needing it based on learned history, and so forth. In the self-directed state 244, the robot will stop its current task if a user requests interaction.

In the rest state 241, the robot is waiting for engagement request, and is not moving, (except possibly to facilitate an engagement request, e.g., occasionally swivel to look for a user). The robot may or may not be recharging in the rest state. In general, the robot is "listening" for communication, e.g., via speech, remote control signals, video input or the like, while conserving energy and avoiding wear-and-tear on its parts. While in the rest state 241, without any new interaction by a user, the robot is able to transition to the self-directed state 244, and can transition to the user-directed state 243 through user-scheduled tasks.

Turning to engagement and attraction, the type of engagement may determine the robot's behavior. For example, the user may use a remote control (proxy) device to engage with the robot, which may relay audio (e.g., speech) via a microphone and/or speakers, visual information through a camera and/or display device, and so on. The robot thus may receive and respond to speech and may suggest commands and display keyword shortcut dialogs. The robot may stop such remote engagement after an inactivity duration period.

In keyword-only engagement, the robot has recognized its name (e.g., via speech recognition) as a keyword even though the robot was not engaged or offering engagement at the time. In keyword-only engagement, the robot may display keyword shortcut dialogs and respond to keyword shortcuts. The robot also may scan for a localized face. Note that to scan for a face in general, the robot may rotate and tilt its head through its full range of motion in a pattern that efficiently covers its full degree field of view; however, the robot may instead scan for a localized face, in which the robot rotates and tilts its head through a limited range of motion in a pattern that efficiently covers a range of field of view centered in the direction of a sound (voice) source, e.g., using sound source localization. The robot remains in keyword-only engagement until dismissed or an inactivity timeout (e.g., 30 seconds) is reached.

With respect to robot name recognition, the robot may have different reactions to recognizing its name that depend on the current context, e.g., while available for engagement, while offering engagement, and while engaged. For example, while available, the robot may pause, turn its head toward the sound source, and scan for a localized face. If no face is detected, the robot enters speech engagement and displays a keyword shortcut dialog, and the robot treats the recognition event as a "subsequent voice heard" step and proceeds with attraction operation, e.g., move toward the sound source, pause and scan for faces, returning to the previous task if no face is detected before a timeout time. If a face is detected, or if the robot is offering engagement, the robot proceeds to "nearby" engagement offer and acceptance operations as described below.

While offering engagement, if the robot recognizes its name, the robot moves to the engaged mode. If the robot recognizes its name while in the engaged mode, and regardless of application state, the displays a context-appropriate keyword shortcut dialog.

In a type of engagement referred to as nearby engagement, the robot and user are in interaction range (e.g., visible range) and the user has accepted the robot's offer for engagement (or possibly vice-versa). The robot remains in nearby engagement until dismissed or an inactivity timeout is reached. Note that the robot can be simultaneously remote proxy device engaged and nearby engaged via proximity with the user. There may be multiple users detected, in which event the current nearby user is determined to be the user whose face is detected closest to the depth camera within interaction range (optionally face recognized and/or optionally authenticated). The Robot creates an interaction plane, tracks and recognizes gesture input from the current user.

When the robot and user are nearby engaged, the robot may detect and track the user's hands for example, and respond to gesture input. The robot may display a menu, display a representation of the user (e.g., the user's avatar) if the user's face is recognized, and so on. If the user's face is not recognized, the robot may display an "unknown" representation, and continue to attempt face recognition throughout engagement.

With respect to initiating engagement, when the robot is in the rest state the robot promiscuously seeks engagement, although the extent and type of seeking may depend on its battery level. In the self-directed state, the robot frequently and regularly (possibly with some randomness inserted) may pause and promiscuously seek engagement. In the user-directed state, the robot does not seek engagement, but will engage if the user directly requests it, e.g., using speech, face detection or the remote proxy device.

Turning to additional details, in the nearby engagement, the robot is attracted to sound and motion, and performs face detection to attempt to recognize a detected face. The robot may offer engagement, and the user may deliberately accept the engagement offer. The offer may be redundant and thus not needed if the user has made it clear that engagement is desired, however for purposes of the explanation below, the robot needs to offer engagement and the user needs to deliberately accept that offer so that the robot does not (annoyingly) engage with every face it detects and not stop engaging.

Examples of engagement acceptance include gaze, in which the user gazes directly (e.g., within fifteen degrees) at the robot's camera for some duration, e.g., two seconds. If the user looks over the robot or to the side, then engagement is not considered to be accepted. The robot may operate differently if in a user-focused attention state in which the user is looking at the robot versus an ambient attention state. Another example is if the user speaks (and the robot recognizes) the robot's name. Gesture may also be detected and used for engagement acceptance, e.g., the user extends a hand forward through an "airtouch" plane, or the user makes another particular gesture, such as to wave a hand back and forth between the use's chin and the robot.

Some applications running on the robot may proactively initiate engagement with any user or a particular user. In such a case, the application may promiscuously look for people and scan for faces. When a face is detected the application may make an engagement offer.

The engagement process may result in undesirable behavior, such as annoying the user. To mitigate engagement problems, the robot may adapt or make other determinations. For example, if the robot detects continuous voices and/or RGB motion from a non-person (the source does not have a head shape), the robot it marks the location of the source as "media player" and ignores voices, motion and faces at that location. The robot may back off engagement, e.g., if the robot makes frequent engagement offers in a location and none are accepted, then the robot temporarily reduces the frequency of its offers in that location or to a particular user. The robot may consider factors such as the urgency of a message to deliver to adjust the frequency. The robot may detect another person and instead attempt to engage with that person. The robot may adapt and sometimes go to one user before another, and vice-versa.

Turning to another aspect, when the user's face is lost to the robot, the assumption is that the user has exited the robot's viewing area (frame) and will return shortly if the user wishes to continue engagement. However, the user may have inadvertently exited the frame but still want to interact. Note that the robot has tracking behaviors when engaged, and thus this may only happen when the user goes outside the interaction range, or moves too fast for the robot to track. Thus, a time duration (e.g., three seconds) is used before considering the user as having exited, e.g., leaving the camera in the same position to help the user return, after which the robot returns to its standard pre-engagement state. A similar situation is when the user has walked away from the robot and does not want to interact anymore; in this case the robot resumes its tasks, e.g., after a few seconds Thus, if the robot loses view of the user's face, the robot resets the camera angle to enable most users to be easily found. The robot then waits for its inactivity timeout to be reached before switching out of the engaged state.

Autonomous engagement behaviors are based on the robot needing to be helpful and interactive, and may be accomplished in part by looking for and approaching a user. When the robot is in the self-directed state or the rest state, the robot observes its surroundings, looking for people, e.g., the robot may rotate its relevant sensors to optimize detection. When the robot detects a person, the robot offers engagement; if the person is outside of the engagement range, the robot may navigate toward the user, and then offer engagement when it is within engagement range.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. For example, a general purpose remote computer described below in FIG. 4 is but one example of a computing device that may form much of the hardware and underlying software platform for a robot device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 4:
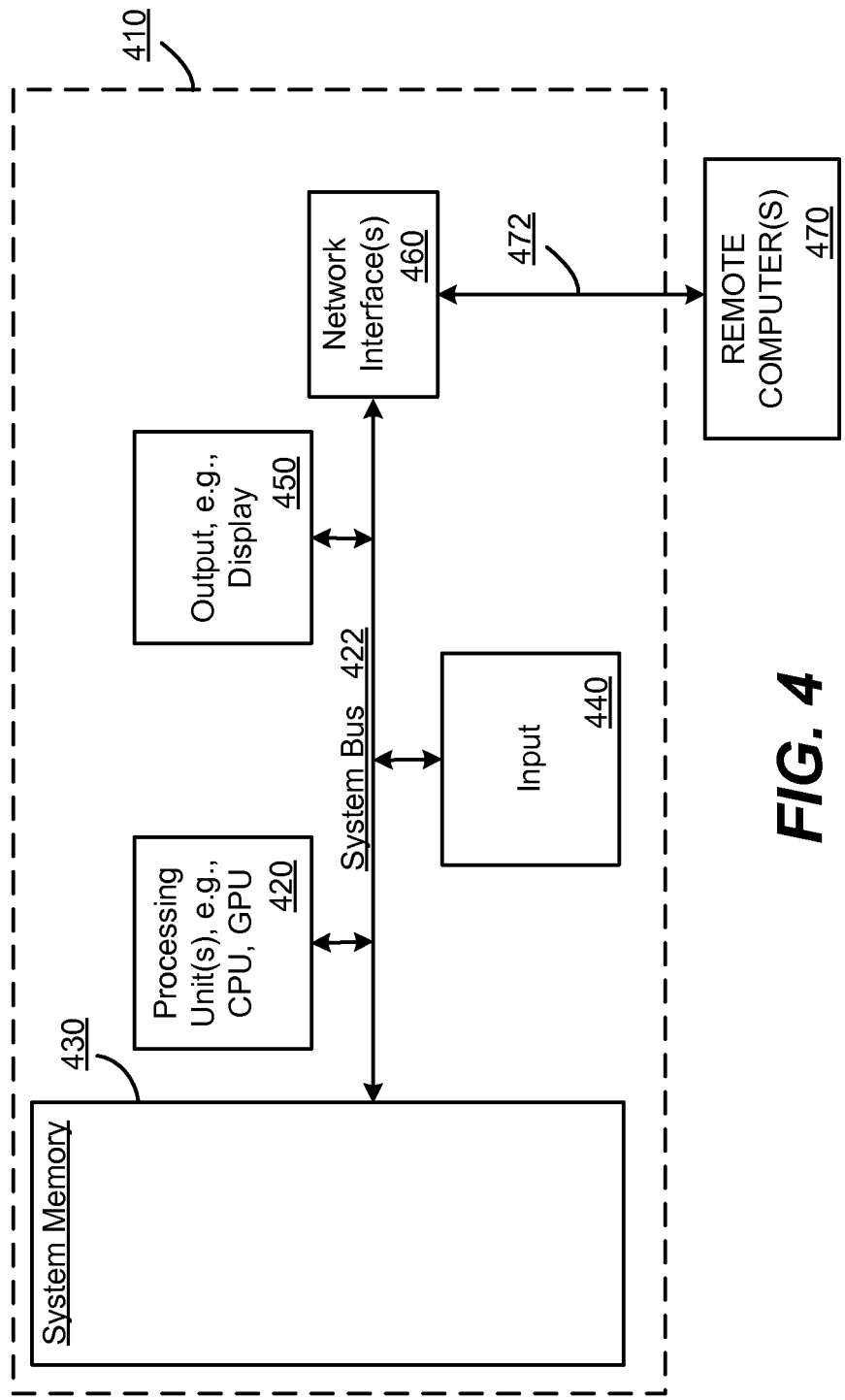
FIG. 4 is a block diagram representing an exemplary non-limiting computing system or operating environment in which one or more aspects of various embodiments described herein can be implemented.

FIG. 4 thus illustrates an example of a suitable computing system environment 400 in which one or aspects of the embodiments described herein can be implemented, although as made clear above, the computing system environment 400 is only one example of a suitable computing environment and is not intended to suggest any limitation as to scope of use or functionality. In addition, the computing system environment 400 is not intended to be interpreted as having any dependency relating to any one or combination of components illustrated in the exemplary computing system environment 400.

With reference to FIG. 4, an exemplary remote device for implementing one or more embodiments includes a general purpose computing device in the form of a computer 410. Components of computer 410 may include, but are not limited to, a processing unit 420, a system memory 430, and a system bus 422 that couples various system components including the system memory to the processing unit 420.

Computer 410 typically includes a variety of computer readable media and can be any available media that can be accessed by computer 410. The system memory 430 may include computer storage media in the form of volatile and/or nonvolatile memory such as read only memory (ROM) and/or random access memory (RAM). By way of example, and not limitation, system memory 430 may also include an operating system, application programs, other program modules, and program data.

A user can enter commands and information into the computer 410 through input devices 440. A monitor or other type of display device is also connected to the system bus 422 via an interface, such as output interface 450. In addition to a monitor, computers can also include other peripheral output devices such as speakers and a printer, which may be connected through output interface 450.

The computer 410 may operate in a networked or distributed environment using logical connections to one or more other remote computers, such as remote computer 470. The remote computer 470 may be a personal computer, a server, a router, a network PC, a peer device or other common network node, or any other remote media consumption or transmission device, and may include any or all of the elements described above relative to the computer 410. The logical connections depicted in FIG. 4 include a network 472, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a robotic device comprising: a sensor set that inputs information into the robotic device; an output mechanism comprising one or more output modalities for communicating with a user; and a model configured to control the operation of the robotic device with respect to operating states, the states including an autonomous task state in which the robot performs a task independent of direct user input, and an engaged state in which the robot interacts with the user via the sensor set and the output mechanism, the model configured to determine when to transition from the autonomous task state to the engagement state, and from the engagement state to the autonomous task state, based on a priority level ordering and a current context including information received via the sensor set.

2. The robotic device of claim 1 wherein the autonomous task state includes a user-directed mode in which the robot performs a task set comprising one or more user tasks based upon user input, and a self-directed mode in which the robot performs one or more tasks that are not based upon user input.

3. The robotic device of claim 2 further comprising a rest state, and wherein the model controls the operation of the robotic device according to a priority level ordering in which the engaged state has a higher priority level than the user-directed mode in the autonomous task state, the user-directed mode has a higher priority level than the self-directed mode in the autonomous task state, and the self-directed mode in the autonomous task state has a higher priority level than the rest state.

4. The robotic device of claim 1 further comprising a rest state, wherein the model is further configured to exit the rest state and enter the engagement state based upon detecting an explicit engagement request, and to exit the rest state and enter the autonomous task state upon detecting a triggering event.

5. The robotic device of claim 1 wherein the model transitions the robot from the autonomous task state to the engagement state when the robot initiates an engagement attempt with the user and the attempt succeeds.

6. The robotic device of claim 1 wherein the model transitions the robot from the autonomous task state to the engagement state when the robot detects the user by a chance encounter, and the robot further detects that the user is possibly interested in interaction with the robot.

7. The robotic device of claim 1 wherein the model transitions the robot from the autonomous task state to the engagement state when the user initiates an engagement attempt with the robot while the robot is performing a task, and while in the engagement state the robot communicates with the user to determine whether to resume the task or remain in the engagement state.

8. In a computing environment, a method performed at least in part on at least one processor, comprising, running one or more programs in a robot that cause the robot to operate autonomously, including performing a task set while in an autonomous task state, detecting a user, attempting to engage with the user, and if the attempt to engage is successful, entering into an engagement state to interact with the user.

9. The method of claim 8 further comprising, entering into the engagement state, interacting with the user, and disengaging from the engagement state based upon a change in current state data.

10. The method of claim 9 wherein disengaging from the engagement state based upon a change in current state data comprises detecting that the user has moved away or otherwise directed attention away from the robot for a sustained period, or receiving communication data corresponding to an disengage command from a user.

11. The method of claim 8 wherein attempting to engage with that user includes pausing a task of the task set and initiating an offer of engagement.

12. The method of claim 8 wherein detecting the user comprises detecting one of a plurality of stimuli, including detecting a remote proxy communication, detecting audio data, or detecting motion, and wherein attempting to engage with the user comprises changing at least one behavior corresponding to the attempt to engage based upon which of the stimuli was detected.

13. The method of claim 8 wherein detecting the user comprises sensing nearby presence of the user by chance, or by sensing nearby presence of the user by actively seeking the user.

14. The method of claim 8 wherein attempting to engage with the user comprises initiating the engagement attempt by moving towards the user, or outputting audible or visible communication data, or both, directed towards the user, or both moving towards the user and outputting audible or visible communication data, or both, directed towards the user.

15. The method of claim 8 wherein attempting to engage with the user comprises adapting the engagement attempt based on previous engagement history with the user.

16. The method of claim 8 wherein adapting the engagement attempt comprises waiting until a frequency-determined time for the engagement attempt is reached.

17. The method of claim 8 wherein the attempt to engage is successful, and further comprising, remaining engaged with the user based upon detecting that the user is looking at the robot, speaking to the robot, or gesturing to the robot, or any combination of looking at the robot, speaking to the robot, or gesturing to the robot.

18. One or more computer-readable media having computer-executable instructions, which when executed perform steps, comprising: running one or more programs in a robot that cause the robot to operate autonomously, including operating in a self-directed mode of an autonomous task state in which the robot independently performs a task; operating in a user-directed mode of the autonomous task state in which the robot performs a user task based on previous input from a user and detection of a triggering event; completing the user task; and operating in another instance of the user-directed mode in which the robot performs another user task, including transitioning to an engagement state from the autonomous task state, receiving information corresponding to the other user task while in the engagement state, and transitioning to the autonomous task state to perform the other user task.

19. The one or more computer-readable media of claim 18 having further computer-executable instructions comprising, transitioning from a rest state to the engagement state, or transitioning from a rest state to the autonomous task state.

20. The one or more computer-readable media of claim 18 having further computer-executable instructions comprising, sensing input data to determine a current context, and wherein the triggering event is based on information corresponding to the current context.

\* \* \* \* \*